United States Patent [19]

Keane et al.

[11] Patent Number: 5,886,075
[45] Date of Patent: Mar. 23, 1999

[54] PROCESS FOR PREPARING POLYVINYLBUTYRAL SHEET

[75] Inventors: John J. Keane, San Diego, Calif.; Ray V. Foss, Parkersburg; Edward W. Hussey, Washington, both of W. Va.

[73] Assignee: E. I. du Pont de Nemours and Company, Wilmington, Del.

[21] Appl. No.: 913,381

[22] PCT Filed: Mar. 14, 1995

[86] PCT No.: PCT/US95/02971

§ 371 Date: Sep. 12, 1997

§ 102(e) Date: Sep. 12, 1997

[87] PCT Pub. No.: WO96/28504

PCT Pub. Date: Sep. 19, 1996

[51] Int. Cl.[6] .............................. B29C 47/38; C08K 5/10; C08K 5/09; C08L 30/02

[52] U.S. Cl. ................... 524/308; 264/211; 264/211.21; 524/306; 524/399; 524/400

[58] Field of Search ................. 264/211, 211.21; 524/296, 297, 306, 308, 399, 400

[56] References Cited

U.S. PATENT DOCUMENTS

| | | | |
|---|---|---|---|
| 4,161,565 | 7/1979 | Hermann et al. | 428/437 |
| 4,180,620 | 12/1979 | Isnkip | 264/211 |
| 4,210,705 | 7/1980 | Inskip | 264/211 |
| 4,230,771 | 10/1980 | Phillips | 524/306 |
| 4,292,372 | 9/1981 | Moynihan | 428/437 |
| 4,297,262 | 10/1981 | Phillips | 524/308 |
| 4,335,036 | 6/1982 | Fowell | 524/376 |
| 4,379,116 | 4/1983 | Moynihan | 524/400 |
| 4,390,594 | 6/1983 | Dages | 524/308 |
| 4,654,179 | 3/1987 | Cartier et al. | 264/211 |
| 4,663,235 | 5/1987 | Fock et al. | 524/399 |
| 4,970,253 | 11/1990 | Hermann et al. | 524/296 |
| 5,137,954 | 8/1992 | Das Gupta et al. | 524/297 |
| 5,187,217 | 2/1993 | Degeilh et al. | 524/297 |
| 5,434,207 | 7/1995 | Fischer | 524/399 |
| 5,728,472 | 3/1998 | D'Errico | 524/399 |

OTHER PUBLICATIONS

Modern Plastics Encyclopedia 1994–95, vol. 71, No. 12, pp. C–99 to C–109.

*Primary Examiner*—Peter A. Szekely
*Attorney, Agent, or Firm*—Hilmar L. Fricke

[57] ABSTRACT

A process for preparing polyvinylbutyral sheet having a desired uniform adhesivity comprising preparing a blend of polyvinylbutyral and a compatible quantity of a at least one plasticizer and an adhesion control agent, and extruding the blend to form a sheet, the improvement comprising monitoring the acidity of the sheet and adding water to the blend as an agent for controlling the adhesivity of said sheet.

12 Claims, 1 Drawing Sheet

PROCESS FOR PREPARING POLYVINYLBUTYRAL SHEET

BACKGROUND OF THE INVENTION

This invention relates to a process of manufacture of polyvinylbutyral (PVB) sheeting having a desired uniform adhesivity for use in laminated safety glass. More particularly, it relates to a process for monitoring the properties and controlling the uniformity of PVB sheeting, in particular the acidity of the sheet and adding water to control the resultant adhesivity of the sheet to glass.

The most widely used vehicle windshield is a three-ply laminate comprising an energy absorbing plastic sheet sandwiched between two glass sheets. Such windshields are capable of absorbing a blow from the head of an occupant with resistance to penetration and shattering. In so doing, the windshields dissipate a substantial amount of impact energy as they undergo plastic deformation.

Polyvinylbutyral resins are capable of being cast or preferably extruded by processes analogous to those used to compound and extrude thermoplastics. Although it is possible to form a plastic sheet directly from polyvinylbutyral resins, the glass transition temperature of approximately 70° C. for PVB resin is too high for laminated glass application. Plasticizer is mixed with PVB resin to lower the glass transition temperature to near 25° C. In the process to form the sheeting film from its molten state, temperatures must be high enough to obtain processable film forming melt viscosities and intimate mixing of the PVB resin and plasticizer.

Plasticizer is typically a large fraction of the final sheet composition. In PVB sheeting, for example, plasticizers contribute 15% to 50% of the film weight, typically 25% to 30%. Choice of plasticizer is limited to materials that are low in volatility, chemically stable under processing conditions, and compatible with the particular acetal resin selected. Diester plasticizers having from 16 to 28 carbon atoms are preferred, and plasticizers based on difunctional acids as well as glycols are also used. Commercially available plasticizers and their compatibility with polyvinylbutyral resin are listed in Modern Plastics Encyclopedia 1994–95, Vol. 71, No. 12, pp. C-99 to C-109. Examples of suitable plasticizers include esters of aliphatic diols with aliphatic carboxylic acids, in particular the esters of di-, tri- and tetraethylene glycol with aliphatic carboxylic acids having 6 to 10 carbon atoms, e.g., triethylene glycol di-(2-ethyl-butyrate), triethylene glycol di-n-heptanoate, or tetraethylene glycol di-n-heptanoate. Also suitable are esters or mixed esters of dicarboxylic acids, preferably adipic, sebasic or phthalic acid with aliphatic alcohols or mixed alcohols. For example, di-n-hexyl adipate, 2-ethylhexyl cyclohexyl adipate, dibutyl phthalate, butyl benzyl phthalate, or hexylphthalate. Also, polymeric propylene oxide oligomers, as disclosed in U.S. Pat. No. 4,335,036, can be used as polyvinylbutyral plasticizers.

Plasticizers are hydrolyzable to various degrees during manufacturing processes for PVB sheeting. Ester-based plasticizers react with water to break down into alcohols and acids. The adhesivity of PVB sheeting is directly proportional to its acidity. In order to be suitable for use in glazing applications, including automobile windshields and architectural glass, PVB sheeting requires controlled, uniform adhesivity. Heretofore, the acidity has been controlled by the use of additives of the type described in U.S. Pat. No. 4,292,372.

SUMMARY OF THE INVENTION

This invention discloses a process for preparing PVB sheeting having a desired uniform adhesivity for glass lamination interlayer applications. The process for preparing PVB sheeting comprises preparing a blend of polyvinylbutyral and a compatible quantity of at least one plasticizer and an adhesion control agent, and extruding the blend to form a sheet. The improvement comprises monitoring the acidity of the sheet and adding water in the sheet forming process as an agent for controlling the resultant adhesivity of the sheet. Water is added before any substantial blending of the polyvinylbutyral and plasticizer occurs. In a preferred embodiment the plasticized composition comprises PVB which has a hydroxyl content from about 15 to 30% by weight, calculated as vinyl alcohol, and from about 20 to 55% by weight of at least one compatible plasticizer.

DETAILED DESCRIPTION OF THE INVENTION

Figure 1:
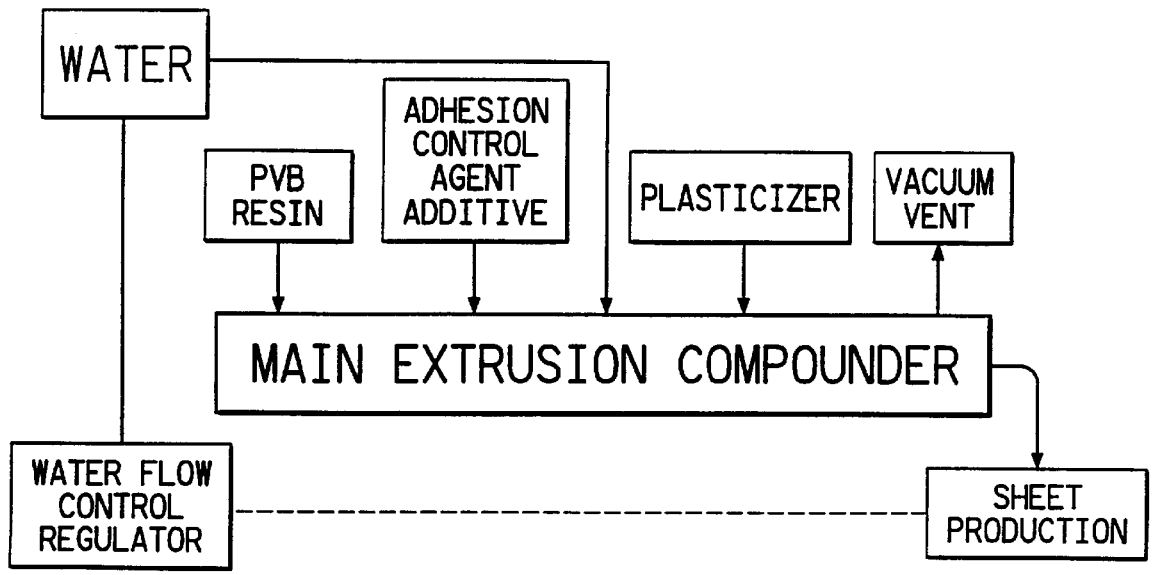
FIG. 1 is a process flow diagram of the feed system to a main extrusion compounder.

The overall process for production of plasticized polyvinyl acetal sheeting consists of mechanical compounding and sheet production. As shown in FIG. 1, polyvinylbutyral resin, plasticizer, adhesion control agent additive, and importantly, water are fed to a main extrusion compounder to form a blend. The extrusion equipment selected and feed rates for the blend will establish the general process conditions used in the extrusion process. The extruded blend exits the main extrusion compounder and is fed to the sheet production process. Acidity tests are performed on the sheet product and the acidity test results are used to set a water flow control regulator, which in turn regulates the flow of water into the main extrusion compounder.

Figure 2:
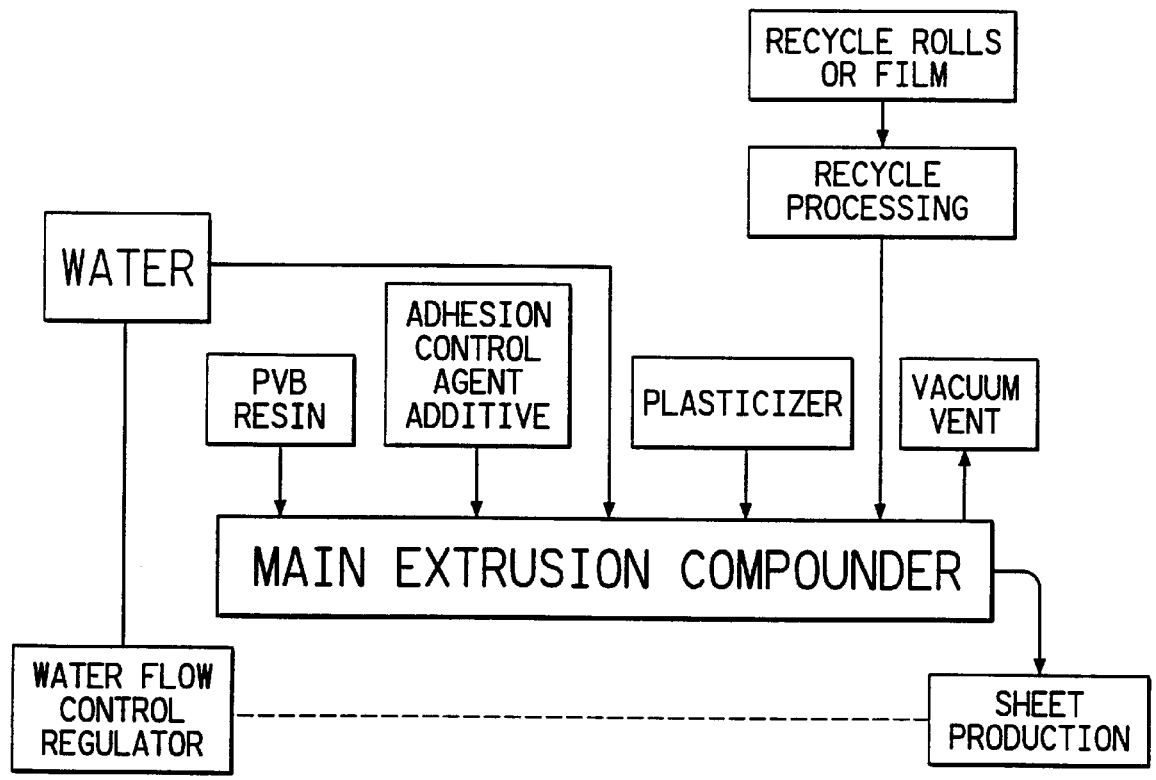
FIG. 2 is the process flow diagram of FIG. 1 modified by the addition of recycle to the main extrusion compounder.

An alternative embodiment, as shown in FIG. 2, is the addition of recycle to the main extrusion compounder. PVB classified as recycle is fed to a satellite mechanical compounder, and subsequently fed to the main extrusion compounder.

The water addition and vapor extraction control system consists of both a means for injecting liquid water directly into the main extrusion compounder at a locus close to the fresh PVB resin feed, and a steam vapor vacuum vent downstream in the main extrusion compounder. Liquid water, preferably purified, distilled, and demineralized, is injected into the main extrusion compounder upstream of the molten recycle addition point, preferably at a point of resin plasticization in the main compounder and as close as possible to the primary PVB resin inlet feed port into the main plasticizing extruder, but without interfering with solids feeding due to steam generation and backflow into the flake inlet port. By accurately measuring the acidity via chemiluminescent titration at a locus downstream of the discharge from the main plasticizing extruder, the concentration of water added is adjusted relative to the inlet feed streams. A concentration of water is maintained within a range of 0.5 to 5 weight percent based on total plasticizer and polyvinylbutyral in order to control the acidity and resultant adhesivity.

Residual water is controlled by a vacuum vent operating at high vacuum below ambient pressure. Due to the increased load from the addition of water, the vapor extraction system must be particularly reliable to ensure the desired water content, which, if too high may cause bubbling of the final sheet product. Preferably, vent port devices for the main compounding extruder should be equipped with mechanically wiped surfaces to remove buildups of solids entrained in the extracted vapor.

In principle, a variety of satellite extruder systems close coupled to a controlled speed gear pump can be used to inject molten PVB recycle resin into the main extrusion compounding device. The satellite recycle extruder can be of any suitable design including single or multiple screws. The recycle web feed stock can be chopped or granulated. Any suitable control system can be used to maintain substantially uniform pressure inlet to the recycle gear pump, which can be operated at any substantially constant speed, and thus output, to set the recycle ratio. Re-melting is accomplished at low temperatures and low screw speeds to prevent plasticizer, or polymer, degradation and assist adhesion chemistry control in the main extrusion compounder.

Preferably, a single screw extruder with pin-barrel, such as model GE-150KS manufactured by Berstorff, may be employed as a satellite feed extruder for full web reclamation of visco-elastic plasticized polyvinylbutyral sheet, film or trim. Adding recycle makes it possible to drop the main screw speed significantly and minimizes acidity generation in the main extrusion compounder.

The pin barrel extruder outlet is close-coupled to, and uses pressure control at, the recycle gear pump inlet which controls the speed of the pin barrel extruder screw to compensate for recycle width fluctuations while filling its gear pump teeth completely. Speed of recycle gear pump, discharging directly into the main extrusion compounder, is preferrably maintained constant to provide a timewise uniform recycle concentration and melt temperature in the main extrusion compounder, while benefiting its rate of thermal energy input. The satellite recycle system injects molten recycle directly into the extrusion process at some optimal locus upstream of the film formation component, and preferably into a middle barrel locus of the main extrusion compounder and downstream of the main resin fresh feed inlet.

Flake granules of one or more PVB resins, preferably with moisture content in the range of 0.5 to 3 weight percent water, are fed into the main extrusion compounder by a system of silos, process vessels and gravimetric feeders. The main extrusion compounder is preferably equipped with intermeshing twin screws and volatiles extraction capability.

A high throughput process yields the maximum rate of heat energy input to barrel zones near the polyvinylbutyral resin feed. The main extrusion compounder screws are preferably configured to accomplish partial polyvinylbutyral fusion before plasticizer addition. Location of the plasticizer injection in important; there is an optimum position for its addition. Preferably, plasticizer is injected at a distance of 5 to 13 screw diameters downstream from the upstream edge of the polyvinylbutyral feed throat. If the plasticizer is injected too far downstream, high yellowness and discharge melt temperature surging occurs. If the plasticizer is injected too close to the first screw working element or isolation stage, plasticizer can back up into the primary feed barrel inlet and cause pluggage.

Other additives may be fed in minor quantities to the main extrusion compounder as appropriate to adjust glass adhesion, see U.S. Pat. No. 4,292,372, and color. Antioxidants, ultraviolet absorbers and stabilizers may be used to prevent deterioration of the plasticized PVB interlayer of a laminate, see U.S. Pat. No. 5,190,826. In providing a desired adhesivity, water and adhesion control agents such as alkali or alkaline earth metal formates, alkali or alkaline earth metal acetates, or the metal carboxylates of magnesium, calcium, or zinc are used. Addition of such additives to the main extrusion compounder as close as possible to the main resin feed inlet is preferred, consistent with vapor control. Adhesion control agents, antioxidants, ultraviolet absorbers and stabilizers, and other additives may be dissolved in aqueous or organic mediums, such as alcohol or preferably, into a liquid plasticizer.

Pigments or colorants may be added to PVB interlayer for tinting or solar control use. Any suitable method for preparing uniformly colored interlayer tints may be used. A combination of colorants and/or pigments may be dispersed as concentrates and added directly to the main extrusion compounder or mixed with the plasticizer prior to injecting the plasticizer into the main extrusion compounder.

The extruded blend from the main extrusion compounder is formed into sheeting by processes known in the art for sheet production, e.g. pressure generation, melt filtration, film formation, sheet quenching, sheet conditioning, sheet cooling and roll or film packaging.

Pressure generation is preferably provided by close-coupling the main extrusion compounder to a high capacity polymer melt gear pump. The gear pump has associated inlet pressure and speed controls. The gear pump inlet pressure is set at the minimum level needed for filling the gear pump teeth uniformly, and avoiding high melt temperatures at the high-pressure gear pump outlet. Fluctuations in gear pump inlet pressure are further controlled, which minimizes variations in the melt temperature rise across the gear pump. When the main extrusion compounder, its feed system, and its screw are properly configured for mixing the blend, the gear pump inlet pressure is substantially free of surging and is controllable by small changes to the main extrusion compounder screw speed and to the melt gear pump speed.

Optionally, this process may be economically expanded by adding or combining in parallel one or more substantially similar extrusion plastization or recycle processes at any locus upstream of a common film forming or coextrusion die. Two or more similar melt streams may be combined in a die tool or flow layering device upstream of a die tool for preparing coextruded multiple layer sheeting. Additionally, static melt mixers may be provided upstream of the die inlet duct to eliminate differences between the sources of molten plasticized resin or may be used in this invention to improve uniformity of film formation.

Penetration resistance of glass laminates is important for suitability as windscreens, and depends on the adhesivity of the PVB interlayer to glass for a particular interlayer thickness. Good windscreen impact performance and penetration resistance is attained at compressive shear strengths of 5,500 to 18,000 kPa (800 to 2600 psi) on laminated windscreens from commercial laminating operations using glass washed with process water, as described in U.S. Pat. No. 4,292,372. If adhesivity measured by compressive shear strength is too high, penetration resistance observed as mean break height is reduced and not optimal. If adhesivity is too low, resistance to penetration is higher but delamination can occur at very low adhesion. A controlled and uniform interlayer adhesivity to glass is needed for suitable use in laminating windscreens and architectural glazing.

Samples of windscreen laminates from commercial laminating operations using as-produced glass washed with process water can be tested as described in U.S. Pat. No. 4,292,372. For each test, typically five or more square or circular specimens with nominal area of 645 $mm^2$ (1.0 square inch) are cut and tested for compressive shear strength. The area of each specimen is measured to the nearest 0.6 mm² (0.001 square inch) from linear dimensions. After conditioning, each specimen is held at a 45° angle to a supporting table in a compression testing machine and a compressive force is applied to shear the sample at the rate of 2.5 mm (0.1 inch) per minute. The force required to break the bond between the glass and the interlayer is recorded. The commercial "windscreen compressive shear strength" is calculated in units of pressure per unit area of laminate tested, as an average of results according to the formula:

$$\text{Windscreen compressive shear strength} = \frac{\text{Force required to break bond}}{\text{Windscreen area to 0.1\% accuracy}}$$

However for process and quality control, adhesivity of the PVB interlayer to glass is measured under controlled laboratory conditions using standard glass washed with demineralized water. Adhesivity is measured in the "demin compressive shear strength" described herein below. The windscreen adhesion index typically has a value of about 0.6, depending on particular windscreen laminating and glass washing conditions, where this ratio is defined by the formula:

$$\text{Windscreen adhesion index} = \frac{\text{Windscreen compressive shear strengh}}{\text{Demin compressive shear strength}}$$

In general, good impact performance in windscreen manufacture is attained at demin compressive shear strengths of 9,600 to 30,300 kPa (1400 psi to 4400 psi) using laboratory laminates wherein glass is washed with demineralized water.

Potassium concentration was determined by x-ray fluorescence spectroscopy of the sheet. In determining acidity, shear strength, and yellowness, the following tests and procedures were used:

Acidity Concentration Analysis: A 4.000 g sample (+/- 0.05 g) of PVB sheeting is dissolved in 100 ml of benzyl alcohol at 75° C. (+/−5° C.) and cooled to ambient temperature. Lucigenin (the term of art for Bis-N-methylacridinium nitrate) indicator solution in methanol is added along with 30% aqueous hydrogen peroxide. A blue-green chemiluminescence is generated under titration to alkaline conditions. A photometric detector senses this chemiluminescence and determines an end point. An automated acid-base titration and calculation is performed using standardized 0.05N sodium hydroxide or sodium methoxide titrant solution in anhydrous methanol. The apparatus used was a fully automated computerized titration system, manufactured by Sanda, 4005 Gypsy Lane, Philadelphia, Pa. 19144 USA. Acidity concentration is calculated in units of equivalents of acid per million parts of sheet (Equiv/1E6) as gram equivalents of the primary acid from plasticizer hydrolysis per million grams, by using appropriate values for molecular weight and valence. Multiple aliquots of preheated benzyl alcohol are titrated and averaged as the blank. Titrant normality is standardized using a known solution of benzoic acid in benzyl alcohol.

Demin Compressive Shear Strength: The adhesion of interlayer samples to glass washed with demineralized water was measured by the following procedure. Samples of interlayer were conditioned by controlled humidity to a standard water content and laminated into two sheets of standard glass washed with demineralized water. For each test, six square or circular laminate specimens with nominal area of 645 mm² (1.0 square inch) are cut from PVB/glass laminate with a water cooled glass cutoff saw or circular cutter having a diamond or carborundum blade. The area of each specimen is measured to the nearest 0.6 mm² (0.001 square inch) from linear dimensions. After conditioning, each specimen is held at a 45° angle to a supporting table in a compression testing machine and a compressive force is applied to shear the sample at the rate of 2.5 mm (0.1 inch) per minute. After conditioning laminates at ambient temperature and controlled humidity, the force required to break the bond between the laboratory washed glass and the interlayer is recorded and the "demin compressive shear strength" is calculated for specimens using "demin" or demineralized water—washed glass by reporting an average for individual results obtained according to the formula:

$$\text{Demin compressive shear strength} = \frac{\text{Force required to break bond}}{\text{Lab sample area to 0.1\% accuracy}}$$

Yellowness Index Test: Yellowness of PVB interlayer is measured on transparent molded disks of interlayer 1 cm thick, having smooth polymeric surfaces which are essentially plane and parallel. The index is measured according to ASTM method D 1925, "Standard Test Method for Yellowness Index of Plastics" from spectrophotometric light transmittance in the visible spectrum. Values are corrected to 1 cm thickness using measured specimen thickness.

The present invention is further illustrated by the following specific examples, in which parts and percentages are by weight unless otherwise indicated, and in which SI units are used (inch-pound units are converted to SI units as so indicated):

EXAMPLE 1

PVB interlayer sheeting was produced using an extrusion plasticization process of this invention by compounding a mixture consisting of 100 parts of dry polyvinylbutyral resin, having a moisture content of less than 2% water and a residual vinyl alcohol concentration of 23% (ASTM D 1396), with 37.4 parts tetraethylene glycol di-n-heptanoate (4G7) plasticizer and 30% of total rate as recycle sheet stock returning from a previous similar extrusion. The main extrusion compounder was a twin-screw Berstorff model ZE130/130A*28/10D. An aqueous solution of potassium formate was fed to the extruder at a rate of 12.5 liters per hour with an adhesion control agent additive concentration sufficient to give nominally 300 parts per million (ppm) potassium in the final sheeting product. A sheet having a nominal thickness of 0.76 mm (0.030 inch) was prepared by the process at a total extrusion rate of 1200 kg/hr (2646 pounds per hour). For purposes of comparison, the process was carried out both with and without injection of 19 liters per hour of demineralized water into Zone No. 3 of the main extrusion compounder. After steady operation with water injection, the pure water addition was stopped and the effect on sheet acidity and resultant adhesivity was observed. The recycle extruder was a Berstorff model GE-150KS*16D single screw extruder with pin barrel. The diameter of the screws in the twin-screw main extrusion compounder was 130 mm (5.1 inch), and the diameter of the single-screw recycle extruder with pin barrel was 150 mm (5.9 inch). Screw speed was 137 RPM in the main extrusion compounder and 15 RPM in the recycle extruder. The process portion of the extruder screw in the main extrusion compounder was about 38 diameters in length with working elements appropriate to the melting and vapor control functions. The main barrel configuration consisted of one short primary PVB flake feed barrel, about 3 diameters long, and seven process barrel sections, each 5 diameters long, to which the process feed streams were added as follows:

| | |
|---|---|
| Barrel No. 1 | PVB -- primary dry flake feed |
| Barrel No. 2 | Potassium formate additive aqueous solution |
| Barrel No. 3 | 4G7 plasticizer and liquid water injection |
| Barrel No. 4 | Melt recycle from the pin barrel extruder |
| Barrel No. 5 | Enclosed process barrel |
| Barrel No. 6 | Enclosed process barrel |
| Barrel No. 7 | Vacuum vapor extraction with wiped adapters |
| Barrel No. 8 | Enclosed process barrel |

The interlayer obtained was analyzed for acidity concentration and yellowness index. Samples of the interlayer were conditioned to 0.47% water content and laminated into two sheets of standard glass washed with demineralized water. The following results were obtained:

| | Comparison | Example 1 |
|---|---|---|
| Demineralized water injected in Barrel 3 | -zero- | 19 l/h |
| Recycle as percent of total plasticized PVB | 30% | 30% |
| Acidity concentration test, Equiv/1E6 | 3.14 | 2.25 |
| Demin compressive shear strength, kPa | 37,020 | 23,880 |
| Demin compressive shear strength, psi | (5369) | (3463) |
| Potassium from adhesion control agent, ppm | 300 | 298 |
| Yellowness index, by ASTM D 1925 | 13.23 | 11.46 |

Water injection into the process of this invention produced a 28% reduction in sheeting acidity concentration. The adhesivity represented by the demin compressive shear strength was reduced to a value within the expected range for good impact performance in windscreen manufacture. Yellowness was reduced.

EXAMPLE 2

The process described in Example 1 was operated without recycle at a total extrusion rate of 1529 kg/hr (3371 pounds per hour) to produce similar sheet having a nominal thickness of 0.76 mm (0.030 inch). Screw speed was 199 RPM in the main extrusion compounder and integrated recycle processing was not operated. An aqueous solution of potassium formate was fed to the main extrusion compounder at a rate of 27.3 liters per hour with an adhesion control agent additive concentration sufficient to give nominally 360 parts per million (ppm) potassium in the final sheeting product. Composition and flow rate of pure demineralized water addition was set to provide plasticized polyvinylbutyral melt with time-wise uniformity for sheet production, substantially similar to Example 1.

A sheeting specimen was analyzed for acidity and yellowness. Sheeting was conditioned and laminated. The resultant adhesivity without recycle was within the range suitable for windscreen manufacture. The following results were obtained:

| | Example 2 |
|---|---|
| Demineralized water injected into Barrel 3 | 23.5 liter/hr |
| Recycle as percent of total plasticized PVB | -zero- |
| Acidity concentration test, Equiv/1E6 | 4.17 |
| Demin compressive shear strength, kpa | 12,160 |
| Demin compressive shear strength, psi | (1764) |
| Potassium from adhesion control agent, ppm | 360 |
| Yellowness index, by ASTM D 1925 | 10.11 |

What is claimed is:

1. A process for preparing polyvinylbutyral sheet having a desired uniform adhesivity comprising preparing a blend of polyvinylbutyral and a compatible quantity of at least one plasticizer and an adhesion control agent, and extruding the blend to form a sheet, the improvement comprising monitoring the acidity of the sheet and adding water to the blend as an agent for controlling the adhesivity of said sheet.

2. The process of claim 1 wherein the water is added before any substantial blending of the polyvinylbutyral and plasticizer occurs.

3. The process of claim 1 wherein the plasticizer is one or more diester organic compounds having from 16 to 28 carbon atoms.

4. The process of claim 3 wherein the adhesion control agent is at least one alkali or alkaline earth metal formate, alkali or alkaline earth metal acetate, or the metal carboxylates of magnesium, calcium, or zinc.

5. The process of claim 1 wherein recycle polyvinylbutyral is added to the blend.

6. The process of claim 5 wherein the recycle polyvinylbutyral is chopped polyvinylbutyral sheet.

7. The process of claim 5 wherein the recycle polyvinylbutyral is molten recycle from a satellite extruder.

8. The process of claim 7 wherein rolls of polyvinylbutyral sheet are fed to said satellite extruder.

9. The process of claim 8 wherein said satellite extruder is a single screw extruder with static pins in the barrel.

10. In a process for preparing a sheet of plasticized polyvinylbutyral by extruding a blend comprised of polyvinylbutyral having a moisture content no more than 3% by weight and a hydroxyl content of from 15 to 30% by weight, calculated as vinyl alcohol, from 20 to 55% by weight of at least one plasticizer selected from the group consisting of triethyleneglycol di-n-heptanoate and tetraethyleneglycol di-n-heptanoate, from 50 to 1500 parts per million parts of the sheet of at least one alkali or alkaline earth metal formate, the improvement comprising controlling the acidity of the sheet by adding water to said polyvinylbutyral in a concentration from 0.5 to 5 weight percent of total plasticizer and polyvinylbutyral to control the acid concentration in the sheet to less than 10 equivalents of acid per million parts of sheet.

11. The process of claim 10 wherein the acidity of the extruded blend is monitored and molten recycle polyvinylbutyral is added.

12. The process of claim 10 wherein water is added prior to any substantial plasticization of the polyvinylbutyral.

\* \* \* \* \*